United States Patent [19]

Portal et al.

[11] 4,226,685
[45] Oct. 7, 1980

[54] ELECTROLYTIC TREATMENT OF PLATING WASTES

[75] Inventors: Charles Portal, Newton, Mass.; Glenn M. Cook, Naperville, Ill.

[73] Assignee: Kennecott Copper Corporation, New York, N.Y.

[21] Appl. No.: 54,924

[22] Filed: Jul. 5, 1979

Related U.S. Application Data

[63] Continuation-in-part of Ser. No. 32,256, Apr. 23, 1979, which is a continuation-in-part of Ser. No. 953,832, Oct. 23, 1978, abandoned.

[51] Int. Cl.² .................... C25C 1/00; C02B 1/82; C25C 7/02
[52] U.S. Cl. .................... 204/105 R; 204/110; 204/149; 204/152; 204/276; 204/283; 204/285
[58] Field of Search .................... 204/105 R, 106, 110, 204/112, 114, 149, 152, 275–276, 283–285, DIG. 13

[56] References Cited

U.S. PATENT DOCUMENTS

| | | | |
|---|---|---|---|
| 1,449,462 | 3/1923 | Van Arsdale | 204/285 X |
| 2,529,237 | 11/1950 | Turner et al. | 204/284 X |
| 3,620,955 | 11/1971 | Jones | 204/283 |
| 3,682,798 | 8/1972 | Tuppenham et al. | 204/285 X |
| 3,954,594 | 5/1976 | Recht | 204/283 X |
| 4,006,067 | 2/1977 | Gussack | 204/149 X |
| 4,172,780 | 10/1979 | Kammel et al. | 204/276 X |

*Primary Examiner*—John H. Mack
*Assistant Examiner*—D. R. Valentine
*Attorney, Agent, or Firm*—John L. Sniado; Anthony M. Lorusso

[57] ABSTRACT

The known method of removing heavy metal and cyanide ions from plating waste solutions wherein the solution is passed through flow-through, high surface area electrodes to precipitate heavy metal ions and to oxidize cyanide is improved through the use of a novel stationary bed dual electrode capable of reducing heavy metal and cyanide ion concentration. The process promotes economical electrolytic purification because it can be accomplished at relatively high current efficiencies. The metals removed from the solutions are recovered in a concentrated form suitable for purification.

11 Claims, 6 Drawing Figures

ELECTROLYTIC TREATMENT OF PLATING WASTES

REFERENCE TO A RELATED APPLICATION

This application is a continuation-in-part of copending U.S. application Ser. No. 032,256, filed Apr. 23, 1979, entitled "Stationary Particulate Bed Dual Electrode" which is a continuation-in-part of U.S. application Ser. No. 953,832, filed Oct. 23, 1978, entitled "Stationary Particulate Bed Dual Electrode" (now abandoned).

BACKGROUND OF THE INVENTION

This invention relates to a method for reducing the cyanide ion and heavy metal content of aqueous solutions of plating wastes. More particularly, it relates to an improvement in the known method of electrolytically reducing the concentration of these contaminants employing a novel dual electrode, usable as a cathode or an anode, which facilitates metal recovery from the solutions and is capable of reducing the metal content of the effluent stream to low levels in a single pass.

Plating wastes comprise aqueous solutions of silver, copper, cadmium, chromium, or other heavy metals. The anion associated with the metal is usually cyanide or sulfate. Conventional plating waste treatment methods have developed slowly and with an emphasis upon the removal of a particular component from a particular waste stream. Currently, the most common method for removing inorganic heavy metals from solutions prior to their disposal is by chemical precipitation. However, different metals precipitate under various conditions, e.g., at various pH levels. When two or more heavy metals are found in the same waste stream, the optimum conditions for precipitation will often be different for the different ions.

Another prior art method for treating waste water is by a cementation process wherein scrap iron, steel wool, or zinc dust is used to cement copper, silver, gold, cadmium, mercury or lead. Both of these conventional treatments substitute new ions for those removed.

Recently, attempts have been made to purify such waste waters by electrochemical methods. Examples of these techniques are disclosed in *Destruction of Cyanide Wastes Within a Packed Bed Electrode*, Chin et al (Plating And Surface Finishing, Vol. 63, October, 1976); *Electrochemical Removal of Silver Ions From Photographic Fixing Solutions Using a Porous Flow Through Cathode*, Van Zee et al (Electrochemical Science And Technology, Vol. 124, May, 1977); and U.S. Pat. No. 3,970,531, H. L. Recht (July 20, 1976). In these and similar processes, the dilute solutions to be purified are passed through a cell having porous, flow-through high surface area electrodes. Typically, the waste solution is recirculated through the cell until the effluent reaches a selected low level. Because of the high surface area of the cathode and the relatively long residence time, large percentages of the ion contents of the waste solutions are plated out at the cell cathode, and cyanide is destroyed by oxidation at the anode. However, the costs of operating this type of purification system has retarded extensive commercial exploitation.

Waste water treatment by conventional processing cannot normally be justified on economic grounds except in limited cases such as those involving the recovery of silver from photographic fixer solutions. Treatment of such waste waters could be improved if the process flow sheet were simplified, the volume of solid waste (which typically require treatment such as dewatering and sludge disposal) was reduced, or the treatment resulted in the production of a solid waste from which valuable metals could be recovered at a reasonable cost.

SUMMARY OF THE INVENTION

The instant invention involves a method of treating plating wastes containing at least one heavy metal and (optionally) cyanide ions such that ionic contaminants are reduced to acceptably low concentrations and the plated metals are available in a concentrated, and thus retrievable form. The process is well suited for treating plating waste solution containing a mixture of metallic contaminants. The process involves the use of a novel dual electrode constructed such that dilute solutions of heavy metals, i.e., aqueous solutions of plating wastes, are efficiently stripped of their metal content, and the metal is deposited in an economically retrievable form. The dual electrode can be used either as a cathode for the electrolytic deposition of heavy metals or as an anode for the destruction of cyanide (and other organic ions) by oxidation. It features quickly releasable latch mechanisms which facilitate removal of the metal-loaded, disposable cathodes, e.g., of particulate carbonaceous material, graphite felt, or the like.

In accordance with a process of the invention, a stationary bed electrode is placed in a tankhouse vessel and an aqueous solution of plating wastes containing heavy metal ions is fed from a manifold and through the electrode's porous, conductive beds. A current is passed through the bed so that a heavy metal or combination of metals is plated onto the beds; a solution reduced in heavy metal concentration is rejected from the vessel. When the metal loading is complete, the electrode is removed from the vessel, and the quickly releasing latch mechanism is opened so that the beds containing the plated metal can be removed and replaced.

Preferably, the electrodes are dual electrodes with a central cavity and include filters for trapping particulate matter suspended in the plating wastes. The filters are also adapted for quick attachment and removal so that down time is minimized.

When the plating waste solution contains cyanide ions or other oxidizable organic ions which are to be removed, a second vessel containing a battery of cells of a design identical to the first is provided downstream. In the second vessel, the polarity of the current is reversed so that the electrodes act as anodes, and organic ions such as cyanide ions are effectively oxidized.

An electrode which can be used to advantage in the process of the invention consists of a stationary bed dual electrode comprising a pair of electrode assemblies adapted for mating to one another in an electrically connected relationship. When mated, the electrode assemblies create an internal cavity for the introduction of the solution from which metal values are to be extracted. Each electrode assembly comprises an electrically non-conductive support frame holding a perforated, electrically conductive flat distributor plate through which the solution flows. This plate serves to distribute evenly both the solution flow and the flow of electrical current. Attached to the side of the perforated distributor plate facing the internal cavity is a filter which serves as a fluid distributor and as a means for removing particulate matter from the waste solution prior to its passage through the distributor plate and porous beds. Attached to the frame and spaced apart from the other side of the distributor plate to form a basket-like compartment is a permeable means for supporting a bed of conductive porous material, e.g., carbonaceous particles, onto which the metal values are deposited.

Accordingly, it is an object of the invention to improve the known method of treating plating wastes by electrode-position in a flow-through electrode.

Another object of the invention is to provide a process for electrolytically purifying waste solutions in which the dissolved heavy metal values are deposited at room temperature in an economically retrievable form as a plated product on a high surface area porous cathode in a single pass.

Another object of the invention is to provide a process which utilizes a novel electrode design featuring an electrode basket and filters which are readily accessible and which eliminates the requirement for an impermeable membrane to separate the anode and cathode.

Yet another object of the invention is to provide a more economically attractive method of electrolytically purifying plating waste solutions.

DESCRIPTION OF THE PREFERRED EMBODIMENT

In accordance with the invention, plating wastes containing ions of at least one heavy metal, e.g., silver, copper, mercury, cadmium, chromium, and/or containing organic ions such as cyanide ion are treated with a novel flow-through electrode to reduce the heavy metal concentration and to convert the metals to a concentrated, retrievable form. The process of the invention, chiefly as a consequence of the electrode design, allows heavy metals to be electrodeposited with improved current efficiencies and allows the deposited metals to be easily retrieved from the cathode structure in a reduced, concentrated form. Since the loaded cathodes may be treated to recover valuable metals, the overall economics of this approach to plating waste treatment become significantly more attractive.

The electrodes useful with the invention are designed such that: (1) heavy metals may be uniformly plated throughout the structure of a porous cathode bed at high current efficiencies; (2) perturbations in the electric field which lead to uneven metal deposition are avoided; (3) the formation of dendrites which frustrate separation of the loaded beds from the remainder of the cathode structure are reduced; and (4) retrieval of the loaded beds and their replacement with fresh beds is greatly facilitated.

Figure 1:
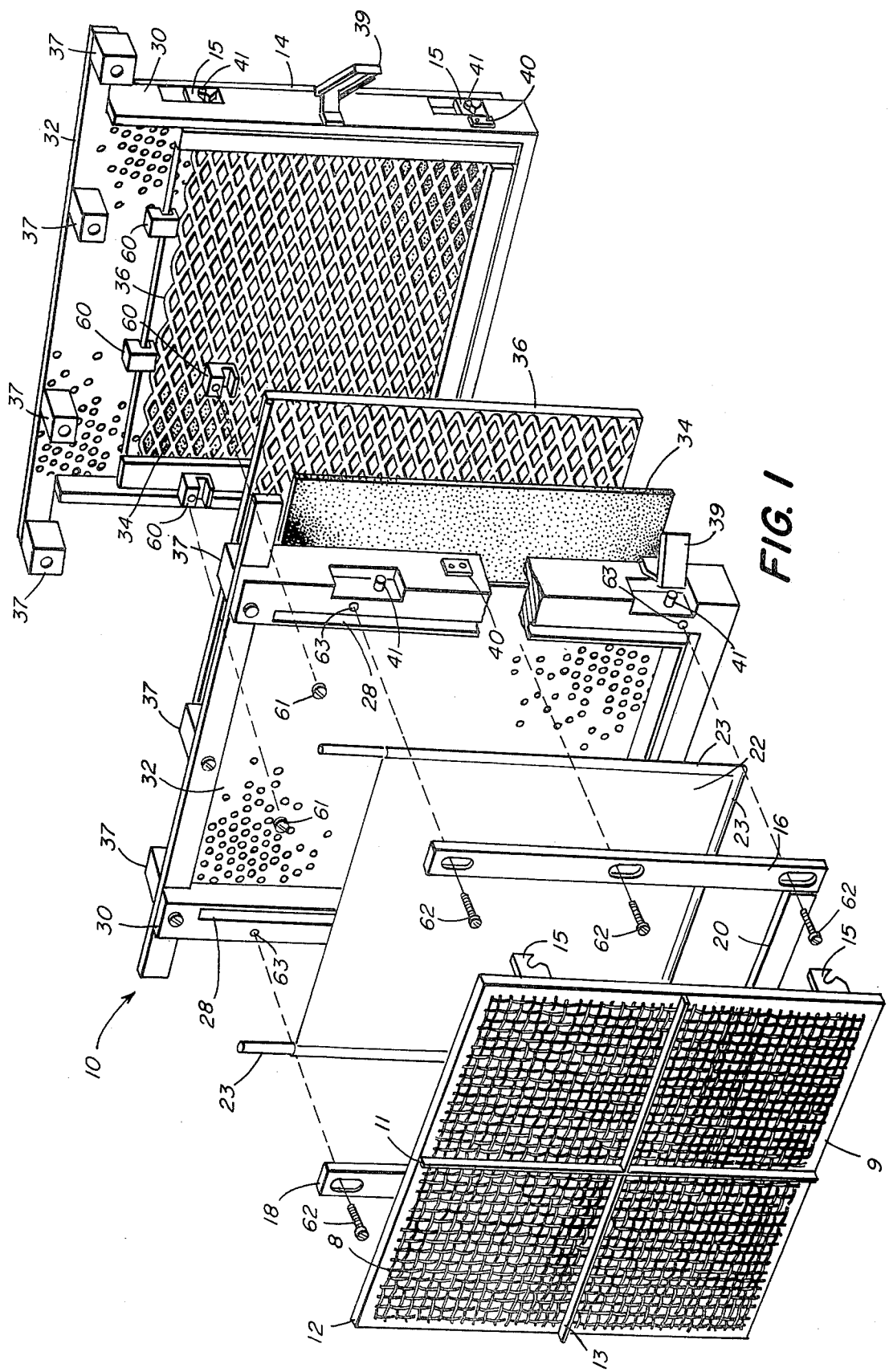
FIG. 1 is a view of the stationary particulate bed dual electrode with one-half shown in exploded perspective view and the other half shown assembled.

One electrode useful in the process of the invention is illustrated in the drawing. Referring to FIG. 1, stationary particulate bed dual electrode 10 comprises two electrode assemblies supported by frames 30 which are electrically nonconductive, e.g., of rigid plastic material. Each frame 30 securely holds a perforated distributor plate 32 made of electrically conductive inert material such as stainless steel. This plate serves to distribute evenly both the flow of the electrolyte solution and the flow of electrical current through the electrode. Filter element 34 is held in contact with plate 32 by retainer screen 36. A suitable filter element material is low density polyurethane foam. The use of such materials as a filter promotes solution flow distribution and screens out particulate material. Retainer screen 36 in turn is attached to plate 32 by means of notched blocks 60, the notches of which surround the top edge of screen 36 thereby permitting the screen to pivot away from plate 32 so that filter element 34 may be easily changed when necessary.

Figure 2:
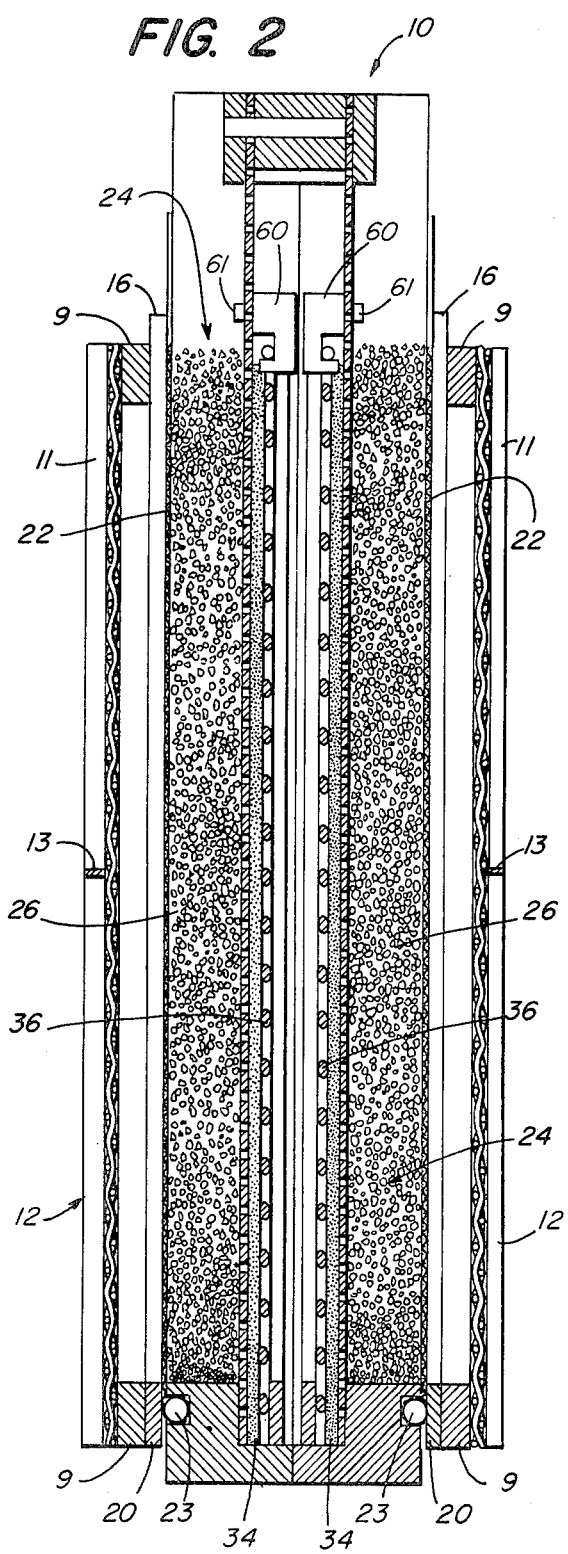
FIG. 2 is a side sectional view of the stationary particulate bed dual electrode of FIG. 1.

Referring to FIGS. 1 and 2, a basket-like compartment 24 is used for holding conductive porous material such as carbonaceous particles 26, e.g., coke. The compartment is bounded by interface liner 22 (which attachs to frame 30) and by distributor plate 32. The two sides and bottom of interface liner 22 are formed into loops for holding dowels 23. These dowels 23 fit within slots 28 of frame 30, thereby securing liner 22 to frame 30 and creating the compartment 24. The dowels 23 are held within slots 28 by quick release clamp strips 16, 18, and 20. These clamp strips are removed quickly and easily by sliding them parallel to frame 30 and then lifting off. Thus, interface liner 22 may be quickly removed from frame 30 to remove metal loaded conductive particles from compartment 24 at the end of a deposition cycle.

Interface liner 22 must discourage bonding of the particulate bed to the liner through the action of dendrites growing through the liner material so that the metal-clad particles may be quickly and easily removed. A suitable liner material is a thin multifilament or monofilament filter cloth having high permeability, a large percentage of open area, and most importantly, a high degree of uniformity of the open areas. A preferred interface liner is 115 micron filter cloth with 35% to 40% open area. Most commercially available synthetic filter cloths may be used. However, natural fiber cloths, e.g., cotton, must be carefully selected. Unbleached muslin, for example, is unacceptable for use with low conductivity waste solutions but acceptable for solutions of conductivities exceeding about 0.2 ohm$^{-1}$ m$^{-1}$.

Figure 5:
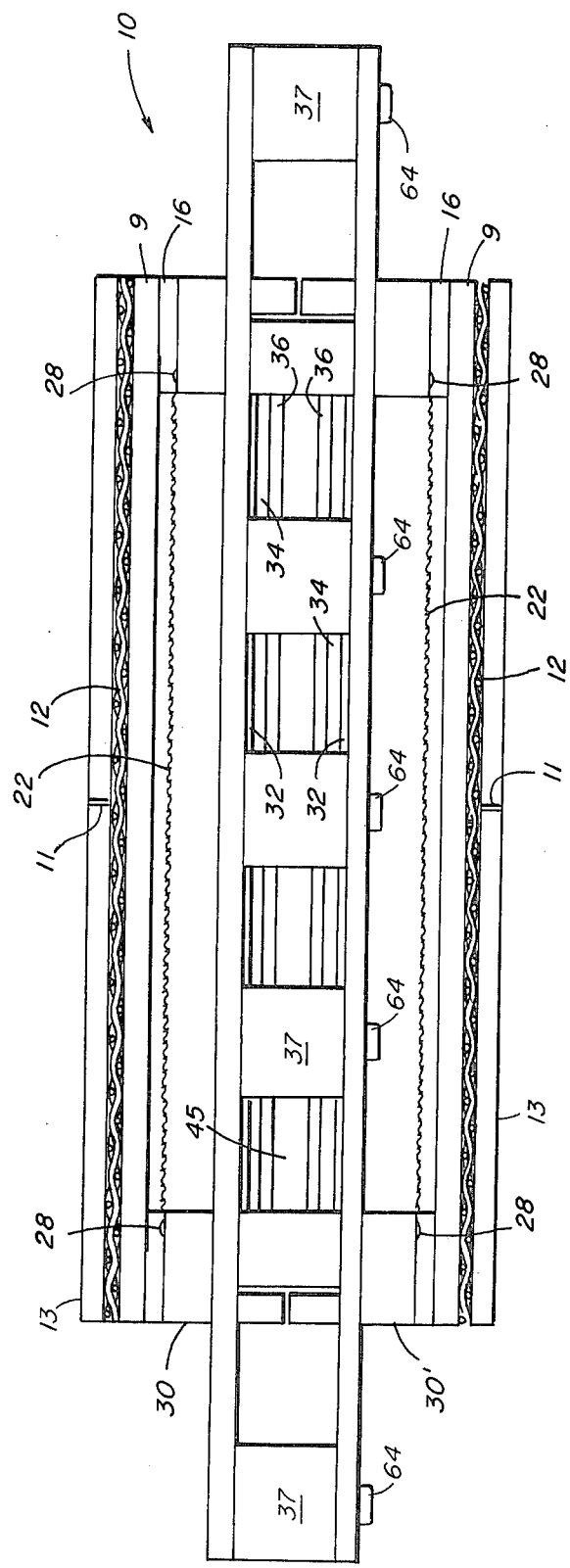
FIG. 5 is a top view of the stationary particulate bed electrode of FIG. 1; and, FIG. 6 is a perspective view of a tankhouse facility holding stationary particulate bed electrodes of the type depicted in FIGS. 1-5.

Referring now to FIGS. 1, 2 and 5, outer support screen 12 overlies interface liner 22 providing the mechanical support necessary to keep the porous bed in place, especially since it will increase in weight as metal from solution is removed. Screen 12 is made of a rigid frame 9 to which interwoven wires 8 (less than $\frac{1}{8}$" diameter) and reinforcing ribs 11 and 13 are attached, thereby forming a rigid structure. Screen 12 attaches to frame 30 by means of open mounting hooks 15 extending from screen 12 which fit over mounting rods 41 on frame 30. Thus screen 12 may be quickly removed by being lifted off mounting rods 41.

Screen 12 must be electrically insulated from the porous bed, as otherwise metal values deposit on it as well as upon the conductive particles 26. In this embodiment, screen 12 is made of metal, e.g., carbon steel or stainless steel, and is insulated with a protective coating of epoxy or vinyl ester.

Figure 4:
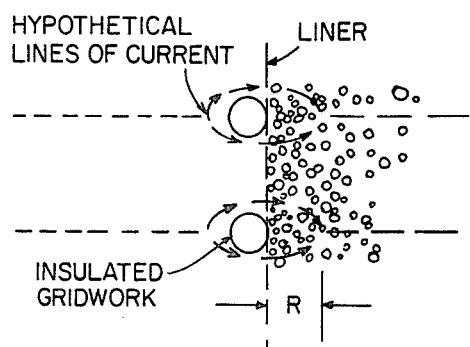
FIG. 4 is a schematic diagram illustrating distortion of lines of electrical current within a particulate bed.

As shown in FIG. 4, the insulated gridwork of screen 12 distorts the lines of electrical current flow within the particulate bed near the interface liner. For plating wastes having very low conductivity, the effective reaction zone, R, is a narrow region near the gridwork. Because of the electrical distortion, those conductive particles lying next to a grid wire are relatively inactive, that is, little metal will deposit on them since little current is flowing in that region. It is therefore important that the grid wires be of small diameter, preferably of diameter equal to or smaller than the diameter of the conductive particles.

Figure 3:
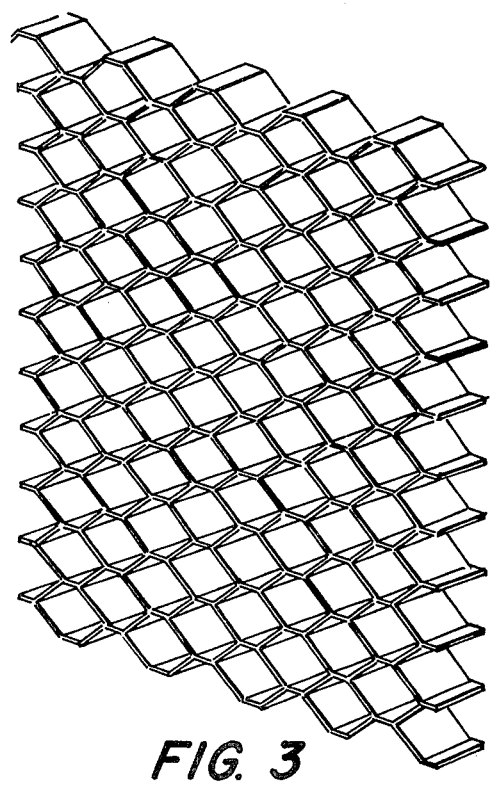
FIG. 3 is a perspective view of a honeycomb configuration for the particulate bed support screen.

In another preferred embodiment, outer screen 12 is made of electrically nonconductive thin strips arranged in a honeycomb configuration as depicted in FIG. 3. Here the thickness of the walls of the honeycomb is smaller than the diameter of particles 36. Such a configuration reduces the number of or makes smaller the unreactive regions in the bed, yet provides the mechanical strength needed for support, especially when metal loaded. A structure such as is shown in FIG. 3 may be made of paper.

Again referring to FIG. 1, the two halves of dual electrode 10 are mated to one another by means of quick release latch elements 39 and 40. Articulating element 39 on one frame 30 engages fixed element 40 on the other frame and pulls the two frames together when latched. The halves are quickly separated when the latches are opened.

Figure 6:
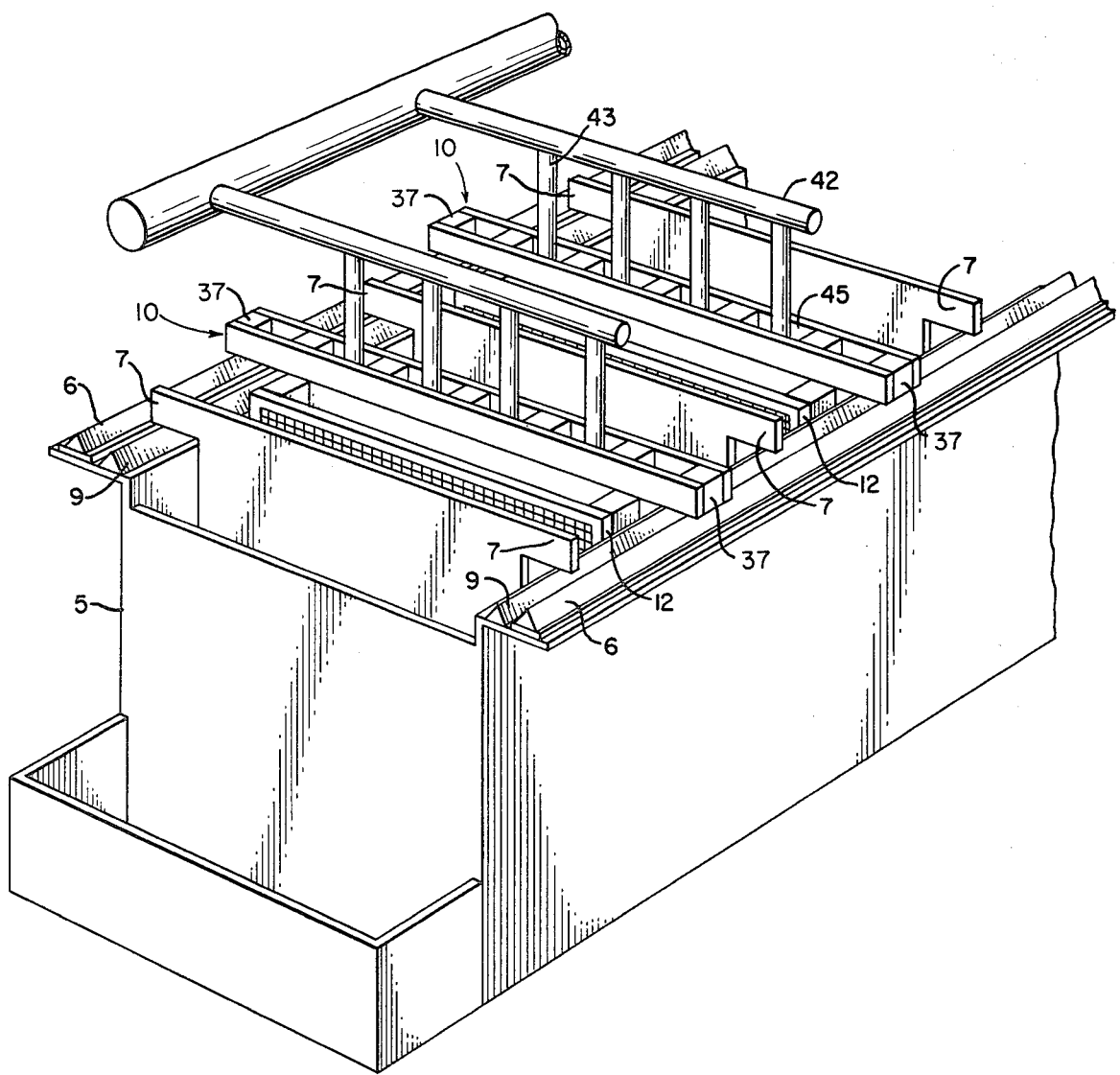

In accordance with the method of the invention, compartments 24 of both sides of the dual electrode are filled with conductive, porous materials such as conductive particles, e.g., coke, or fibrous mats of graphite carbon or carbon felt. Dual electrodes 10 are then placed in a conventional tankhouse vessel 15, as depicted in FIG. 6, sandwiched between inert counter electrodes. The apparatus may be used to plate metals if electrodes 10 are employed as cathodes; if the polarity of the cell is reversed, organic ions such as cyanide ion are oxidized in compartments 24, resulting in the production of $CO_2$, $N_2$, and possibly $NH_4^+$. In an appropriate case, small quantities of certain materials known to promote the operation of this type of system may be added to the plating waste prior to treatment. For example, chloride ion may be added to aid in the destruction of cyanide by means of $ClO^-$ formation.

In operation, a plating waste solution to be treated is introduced from the top of dual electrode 10 into cavity 45 (FIG. 6) formed by the mating of the two electrode assemblies. The solution is introduced by means of supply manifold 42 feeding discharge ports 43. The dual electrode disclosed herein is designed to be used in a conventional electrowinning cell as shown in FIG. 6. Dual electrode 10, in this case cathodes, rest on negative bus bars 6 of cell 5, and are sandwiched between anodes 7, which rest on positive bus bars 9. Of course, the positive and negative bus bars are insulated from each other. In this embodiment contact blocks 37 are each formed from a conductive metal. It is possible to use a single bus bar delivery system by forming one block 37 of an insulator and allowing that block to contact the anode bus bar. Of course, in this case, the arm of anode 7 that contacts the cathode bus bar would be insulated.

With the electrodes in position, the plating wastes are introduced via a supply manifold 42 feeding discharge ports 43 directly into the cavity formed between the distributor plates. The solution is distributed evenly through distributor plate 32; metals are reduced within the porous cathode and plate directly onto its surface. The flow rate of solution is kept relatively low so that, within the porous beds, the ratio of ion diffusion distance to diffusion velocity is much less than the ratio of reaction zone thickness (effective region in bed) to forced convective flow velocity. In this manner, relatively long reaction times result in high removal efficiencies. The voltage across the cells may vary widely up to the level at which hydrogen and/or oxygen is generated. Accordingly, numerous electrochemical reactions involving quite dilute solutions take place at rates which would otherwise be too low for commercial applications.

When the beds have received their full complement of metal, the current is shut off and the cathodes are removed. Thus, support screen 12 and surface liner 22 are disconnected and the loaded beds are removed intact and replaced with fresh beds. The metal loaded cathodes may be treated by conventional purifying techniques to obtain useful metals and alloys or plating solutions.

Filters 34 may also be easily changed by opening latch members 39 and 40, allowing separation of the respective assemblies, and tipping retainer screens 36 upwardly to expose the filter elements 34. On reassembly, the cathodes are again placed in tankhouse 5 for further use.

In situations where the plating waste solution to be purified contains organic ions such as cyanide ions, in addition to the one or more heavy metal ions, the effluent from a first tankhouse, such as that depicted in FIG. 6, is collected and distributed to an identical structure in which the polarity has been reversed. In this case, cyanide ion is oxidized within the beds, now acting as anodes.

The invention will be further understood from the following nonlimiting example.

A run was carried out with the cell shown in FIG. 1. The porous carbonaceous electrode 26 was made of Asbury 206 charcoal particles, the screen analysis (size distribution) was as follows:

| Mesh | % |
| --- | --- |
| +10 | 0.5 |
| −10 +20 | 17.7 |
| −20 +30 | 41.4 |
| −30 +40 | 23.0 |
| −40 +60 | 12.2 |
| −60 +80 | 3.5 |
| −80 | 2.8 |

The active compartments 24 were 10" wide, 1¼" thick and were filled with charcoal to a height of 11".

The anodes 7 were made of two pieces of stainless steel wrapped with carbon cloth. The overall dimensions were 12"×15" and the active area was 12"×11".

The inlet stream was a synthetic solution of 150 ppm of copper as cupric sulfate and the solution was adjusted to pH=3 with sulfuric acid. The flow rate was 190 cc/min. The total applied current was 3 Amp (corresponding to an anodic current density of 1.8 mA/cm) and a cell voltage of 7.5 volts.

A total of 20 gallons of solution was processed in six hours in two passes of three hours each. However, steady state for each pass was reached in two hours, the outcome copper concentration was 33 ppm and 15 ppm in the first and second pass respectively. The materials of the cell are given below.

TABLE 1

| Parts Description | Material of Construction |
|---|---|
| Frames 30 | PVC |
| Perforated Distributor Plates 32 | Stainless Steel |
| Filter Element 34 | Polyurethane Form |
| Retainer Screen 36 | Steel with Epoxy Coating |
| Notched Blocks 60 | PVC |
| Porous Carbonaceous Particle Cathode 24 | Asbury 206 charcoal |
| Interface Liner 22 | Pollen TF2106 Non-Woven Textile |
| Loops for holding device 23 | PVC |
| Quick Release Clamp Strips 16, 18, 20 | PVC |
| Outer Support Screen 12 | Carbon Steel with Epoxy Coating |
| Reinforcing Ribs 11, 13 | Carbon Steel with Epoxy Coating |
| Mounting Hooks 15 | Carbon Steel with Epoxy Coating |
| Mounting Rods 41 | Stainless steel |
| Latch Elements 39, 40 | Plastic |
| Inert Counter Electrode 7 | SS wrapped with Carbon Cloth |
| Discharge Ports 43 | Tygon tubing |

As various changes could be made in the above preferred embodiments without departing from the scope of the invention, it should be understood that all matter contained in the above description or shown in the accompanying drawings shall be interpreted as illustrative and not in a limiting sense.

We claim:

1. In the method of reducing the concentration of a heavy metal in an aqueous solution of plating wastes wherein the metal is precipitated electrolytically as it passes through a high surface area flow-through electrode, the improvement comprising:
    A. placing a stationary bed electrode in a tank, said electrode comprising
        mating electrically nonconductive support frames;
        a pair of perforated, electrically conductive, flow distributor plates attached to each frame and facing each other to form a cavity;
        a pair of porous, bed supports adapted for attachment to said frame on the side of each distributor plate opposite the cavity creating a pair of basket-like compartments;
        a porous, conductive bed in each of said compartments; and
        a first quickly releasing means for holding said mated frame together;
    B. feeding a solution of plating wastes to the cavity and through the distributor plates and beds while passing a current through the bed to plate a heavy metal therein and rejecting a solution reduced in heavy metal concentration from the tank;
    C. releasing said first quickly releasing means to expose the bed;
    D. removing the bed containing plated heavy metal from said compartment;
    E. placing a fresh porous conductive bed in said compartment; and
    F. repeating steps A through E.

2. The process as set forth in claim 1 wherein said aqueous solution of plating wastes contains suspended matter and said electrode further comprises
    filter means adapted for quick attachment to and removal from the upstream side of said distributor plates, and
    second quickly releasing means for attaching said filter means to said distributor plate, said process comprising the further steps of:
        feeding said solution of plating wastes sequentially through the filter means and bed;
        releasing said second quickly releasing means; and
        replacing the particulate matter-loaded filters with fresh filters.

3. The process as set forth in claim 1 wherein the plating waste solution further contains cyanide ions, said process comprising the further steps of feeding the solution rejected in step B into the bed of an electrode as set forth in claim 1, employed as an anode, to oxidize the cyanide ions therewithin.

4. The process as set forth in claim 1 wherein said first quickly releasing means comprises a plurality of latches, each latch comprising a stationary member attached to one of said electrode assembly support frames and a quick release articulating member attached to the other of said electrode assembly support frames, said articulating member adapted to securely engage said fixed member thereby holding said electrode assemblies in said mated relationship.

5. The process as set forth in claim 1 wherein said filter means comprises a filter element and a nonconductive retainer screen holding said filter element against said distributor plate.

6. The process as set forth in claim 5 wherein said second quickly releasing means comprises two notched blocks attached to said perforated distributor plate, said notches closely surrounding one edge of said retainer screen thereby allowing said retainer screen to pivot away from said distributor plate when said electrode assemblies are unmated and permitting said filter element to be quickly changed.

7. The process as set forth in claim 1 wherein said bed support comprises a cloth-like interface liner of uniform open spaces and an overlying support screen having strand thickness of less than ⅛" attached to said frame by third quickly releasing means.

8. The process as set forth in claim 7 wherein said third quickly releasing means comprises
    A. a plurality of open mounting hooks on said support screen adapted to fit releasably over mounting rods extending from said frame thereby holding said support screen; and,
    B. dowels attached to the sides of said interface liner, said dowels closely fitting within slots in said frame, and
    C. quickly releasing clamp strips adapted for attachment to said frame to hold releasably said dowels in said slots thereby securely holding said interface liner.

9. The process as set forth in claim 7 wherein said interface liner comprises a thin multifilament filter cloth of uniform open spaces to discourage the bonding of said bed to said interface liner, said cloth having high permeability and a large percentage of uniformly dimensioned open areas.

10. The process as set forth in claim 7 wherein the porous bed comprises packed conductive particles and said support screen comprises interwoven wires whose diameter are less than three times the diameter of said conductive particles.

11. The process as set forth in claim 7 wherein said support screen comprises a honeycomb configuration of nonelectrically conductive material having a cell wall thickness of less than ⅛".

* * * * *